(12) United States Patent
Yang

(10) Patent No.: US 11,585,092 B2
(45) Date of Patent: Feb. 21, 2023

(54) STRUCTURAL STEEL MEMBER CONNECTING ASSEMBLY

(71) Applicant: JING-XIN SOLAR LTD., Tainan (TW)

(72) Inventor: Ching-Lung Yang, Tainan (TW)

(73) Assignee: JING-XIN SOLAR LTD., Tainan (TW)

( * ) Notice: Subject to any disclaimer, the term of this patent is extended or adjusted under 35 U.S.C. 154(b) by 234 days.

(21) Appl. No.: 16/906,545

(22) Filed: Jun. 19, 2020

(65) Prior Publication Data
US 2021/0340765 A1    Nov. 4, 2021

(30) Foreign Application Priority Data

Apr. 30, 2020   (TW) ................................ 109205247

(51) Int. Cl.
| | |
|---|---|
| *E04C 3/11* | (2006.01) |
| *E04C 3/08* | (2006.01) |
| *E04B 1/24* | (2006.01) |
| *E04C 3/04* | (2006.01) |

(52) U.S. Cl.
CPC .............. *E04C 3/11* (2013.01); *E04B 1/2403* (2013.01); *E04C 3/08* (2013.01); *E04B 2001/2418* (2013.01); *E04C 2003/0473* (2013.01)

(58) Field of Classification Search
CPC ...... E04C 3/11; E04C 3/08; E04C 2003/0473; E04C 2003/0491; E04B 2001/2439; E04B 1/2403; E04B 2001/2418; E04B 2001/2415; E04B 1/24; E04B 1/2608; E04B 1/2612; E04B 7/045; E04B 2001/2448; E04B 1/3211; E04B 7/163; E04B 7/166; Y10T 403/32008; Y10T 403/32041; Y10T 403/32049
See application file for complete search history.

(56) References Cited

U.S. PATENT DOCUMENTS

| | | | | |
|---|---|---|---|---|
| 279,415 | A | * | 6/1883 | Miller ....................... F16D 3/38 464/119 |
| 1,787,167 | A | * | 12/1930 | Purdy ................... E04B 1/2604 16/249 |

(Continued)

*Primary Examiner* — Brian E Glessner
*Assistant Examiner* — Adam G Barlow
(74) *Attorney, Agent, or Firm* — Muncy, Geissler, Olds & Lowe, P.C.

(57) ABSTRACT

A structural steel member connecting assembly includes a first connecting member and a second connecting member. The first connecting member is pivotally connected to a positioning portion of a first structural steel member and therefore can be swung. The second connecting member is pivotally connected to the first connecting member such that the two connecting members are rotatable with respect to each other. The second connecting member has a fixing portion coupled with a second structural steel member such that the longitudinal directions of the two structural steel members intersect. With the second connecting member rotatable with respect to the first connecting member, the installation angles of the two structural steel members can be easily changed in order to make a stable engineering structure. The structural steel member connecting assembly features convenience of, and flexibility in, use and has extensive applications.

6 Claims, 8 Drawing Sheets

(56) References Cited

U.S. PATENT DOCUMENTS

| | | | | |
|---|---|---|---|---|
| 3,521,421 | A * | 7/1970 | Schroeder, Jr. | E04B 1/3441 |
| | | | | 403/53 |
| 4,304,078 | A * | 12/1981 | Meriwether, Jr. | E04F 21/0015 |
| | | | | 403/53 |
| 4,365,488 | A * | 12/1982 | Mochida | F16D 3/38 |
| | | | | 464/134 |
| 5,303,520 | A * | 4/1994 | Gozdziak | E04C 3/17 |
| | | | | 52/713 |
| 5,649,778 | A * | 7/1997 | Lin | B23Q 1/0027 |
| | | | | 403/57 |
| 5,943,830 | A * | 8/1999 | Truitt | E04G 21/26 |
| | | | | 254/133 A |
| 6,112,475 | A * | 9/2000 | Truitt | E04G 21/26 |
| | | | | 52/150 |
| 7,918,054 | B2 * | 4/2011 | Grafton | E04B 7/02 |
| | | | | 248/300 |
| 10,156,264 | B2 * | 12/2018 | Davidson | F16M 11/121 |
| 2009/0057019 | A1 * | 3/2009 | LaValley | E21B 19/14 |
| | | | | 175/85 |
| 2013/0109005 | A1 * | 5/2013 | Hardy | A63H 3/04 |
| | | | | 403/53 |
| 2016/0069075 | A1 * | 3/2016 | Powers, III | E04B 7/163 |
| | | | | 52/93.2 |
| 2018/0334801 | A1 * | 11/2018 | Brean | E04B 7/163 |
| 2022/0090372 | A1 * | 3/2022 | Landreth | E04B 1/40 |

\* cited by examiner

STRUCTURAL STEEL MEMBER CONNECTING ASSEMBLY

BACKGROUND OF THE INVENTION

1. Field of the Invention

The present invention relates to an engineering structure and more particularly to a structural steel member connecting assembly.

2. Description of the Related Art

To put up an engineering structure such as a truss, architectural skeleton, or steel frame, it is typically required to prepare structural steel members or frame members of different lengths in advance. The structural steel members or frame members are then connected as needed, e.g., in their predetermined vertical or horizontal orientations, by means of connecting elements in order to form a particular shape, and for the resulting structure to be used in the following construction process.

The place where the structural steel members or frame members are put together may be a plot of land or an existing building on the construction site. As the ground of the land may not be completely horizontal and the exiting building may have limited space for assembly, the connecting elements may have problem connecting those members in the conventional way; in that case, special connecting elements must be made, and a complicated connecting process is required to complete the assembly.

SUMMARY OF THE INVENTION

The primary objective of the present invention is to provide a structural steel member connecting assembly that can be used to construct a stable engineering structure with ease, features flexibility in use, and has extensive applications.

To achieve the above objective, the structural steel member connecting assembly of the present invention is configured to couple two structural steel members together, with each of the two structural steel members having a longitudinal direction, and one of the structural steel members (hereinafter referred to as the first structural steel member) being provided with at least one positioning portion along its longitudinal direction. The structural steel member connecting assembly includes a first connecting member and a second connecting member. The first connecting member is pivotally connected to the at least one positioning portion of the first structural steel member in such a way that the first connecting member can be swung with respect to one end of the first structural steel member about a first axis. The second connecting member is pivotally connected to the first connecting member in such a way that the first connecting member and the second connecting member can be rotated with respect to each other about a second axis. The second connecting member has a fixing portion coupled with the other structural steel member (hereinafter referred to as the second structural steel member); as a result, the longitudinal directions of the two structural steel members intersect, and the second structural steel member can be swung with respect to the first connecting member about the second axis via the second connecting member. The structural steel member connecting assembly makes it possible to construct a stable engineering structure, enables easy and flexible assembly, and can be extensively used wherever applicable.

Preferably, the first connecting member has a top plate and two first side plates provided respectively on two opposite sides of the top plate, and the top plate as well as each of the two first side plates has an aperture. The first axis is defined by the centers of the apertures of the two first side plates, and the second axis by the center of the aperture of the top plate.

Preferably, the top end of the first structural steel member is inserted in between the two first side plates of the first connecting member, and the first connecting member is pivotally connected to one of the at least one positioning portion of the first structural steel member such that the two structural steel members can be swung with respect to each other about the first axis.

Preferably, the second connecting member has a bottom plate and two second side plates provided respectively on two opposite sides of the bottom plate, and the bottom plate of the second connecting member is pivotally connected to the first connecting member in such a way that the bottom plate can be rotated about the second axis. The second structural steel member is placed in between the two second side plates of the second connecting member.

Preferably, the second structural steel member is pivotally connected to the fixing portion of the second connecting member and can therefore be swung with respect to the first structural steel member about a central axis defined by the fixing portion.

Preferably, the first connecting member has a guide groove, and a bolt is passed through the guide groove of the first connecting member and one of the at least one positioning portion such that when the first connecting member is swung with respect to the first structural steel member, the angle by which the first connecting member can be swung with respect to the first structural steel member is limited by the guide groove.

Preferably, the first connecting member has a guide groove, and a bolt is passed through the guide groove of the first connecting member and the second connecting member such that when the second connecting member is rotated with respect to the first connecting member, the angle by which the second connecting member can be rotated with respect to the first connecting member is limited by the guide groove.

The technical contents and features of the present invention will be detailed further below. As a person skilled in the art would understand, the following detailed description and the specific embodiment provided therein serve illustrative purposes only and are not intended to be restrictive of the scope of the patent protection sought by the applicant.

DETAILED DESCRIPTION OF THE INVENTION

It should be pointed out in the first place that the present invention can work with and be used in conjunction with a variety of structural steel members or posts, regardless of the installation purposes or the fields of application of those members or posts. In addition, as a person skilled in the art would understand, the terminologies used herein are superordinate terms, which impose no limitations on the application of the invention. For example, terms associated with structure, shape, direction, or the provision of elements are used herein to describe their respective features as demonstrated, but not limited to those demonstrated, in this specification, and are not restrictive of the operation method of the invention.

Figure 1:
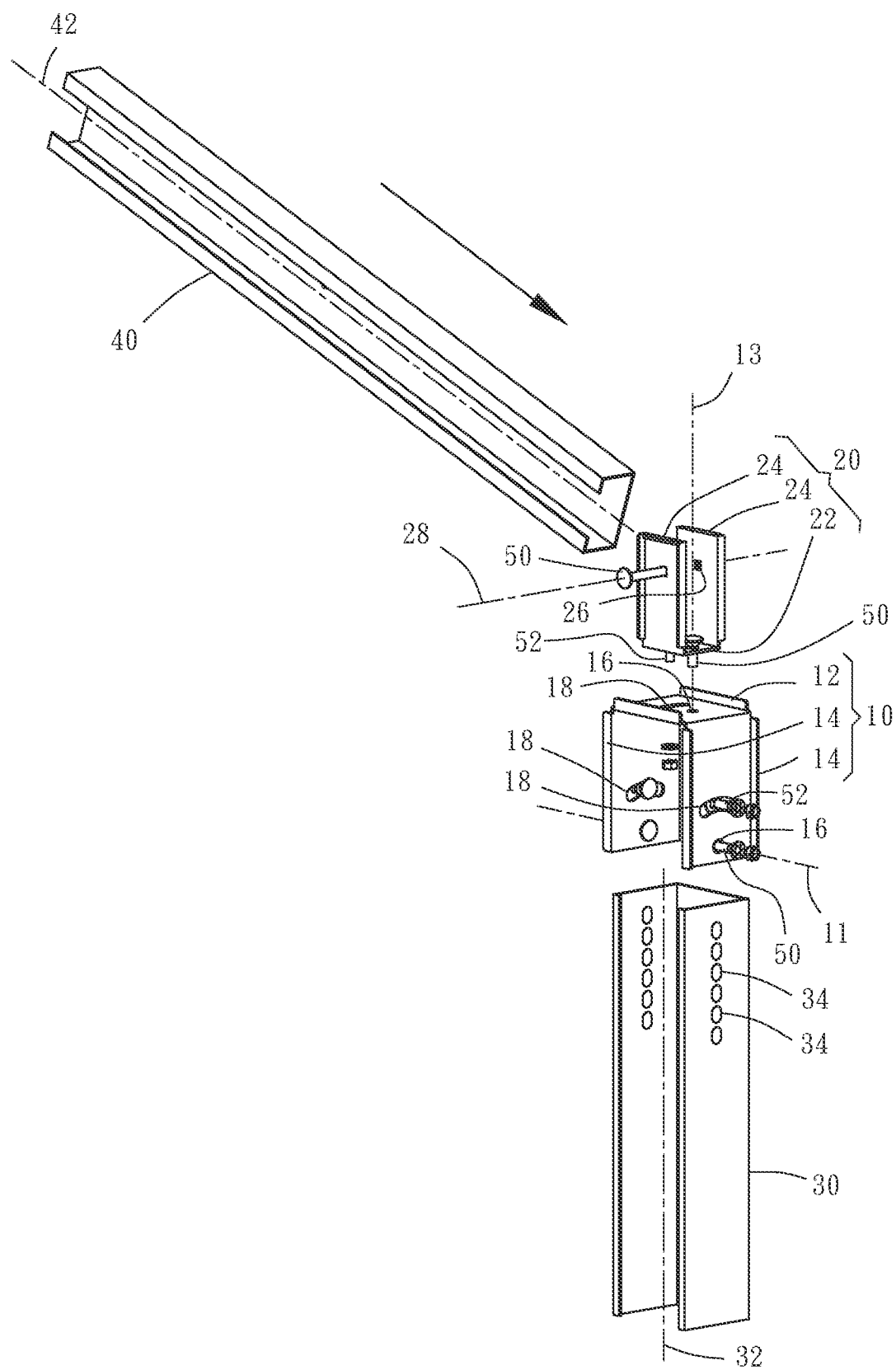
FIG. 1 is an exploded perspective view of a preferred embodiment of the present invention.
Figure 2:
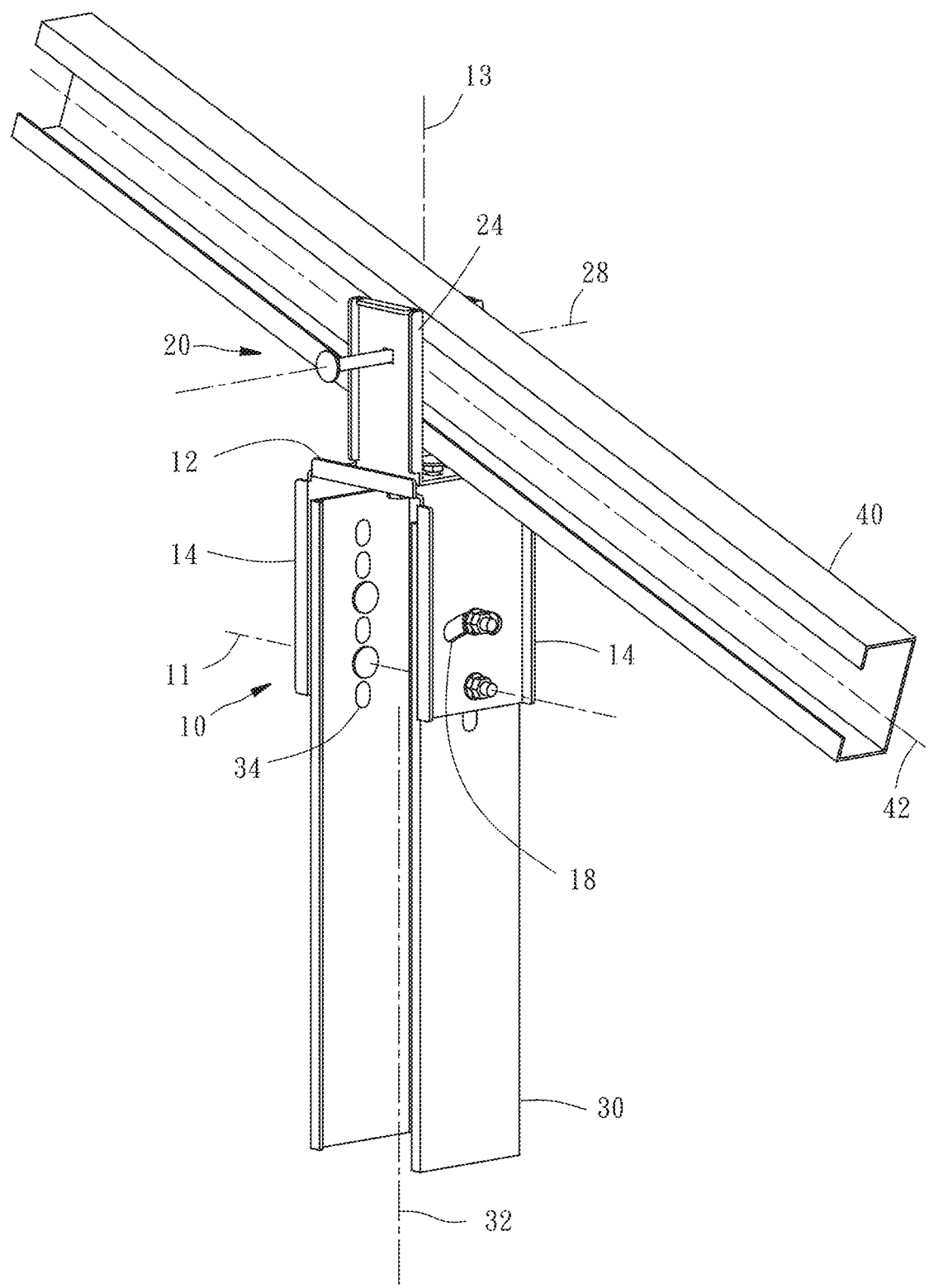
FIG. 2 is an assembled perspective view of the preferred embodiment in FIG. 1.
Figure 3:
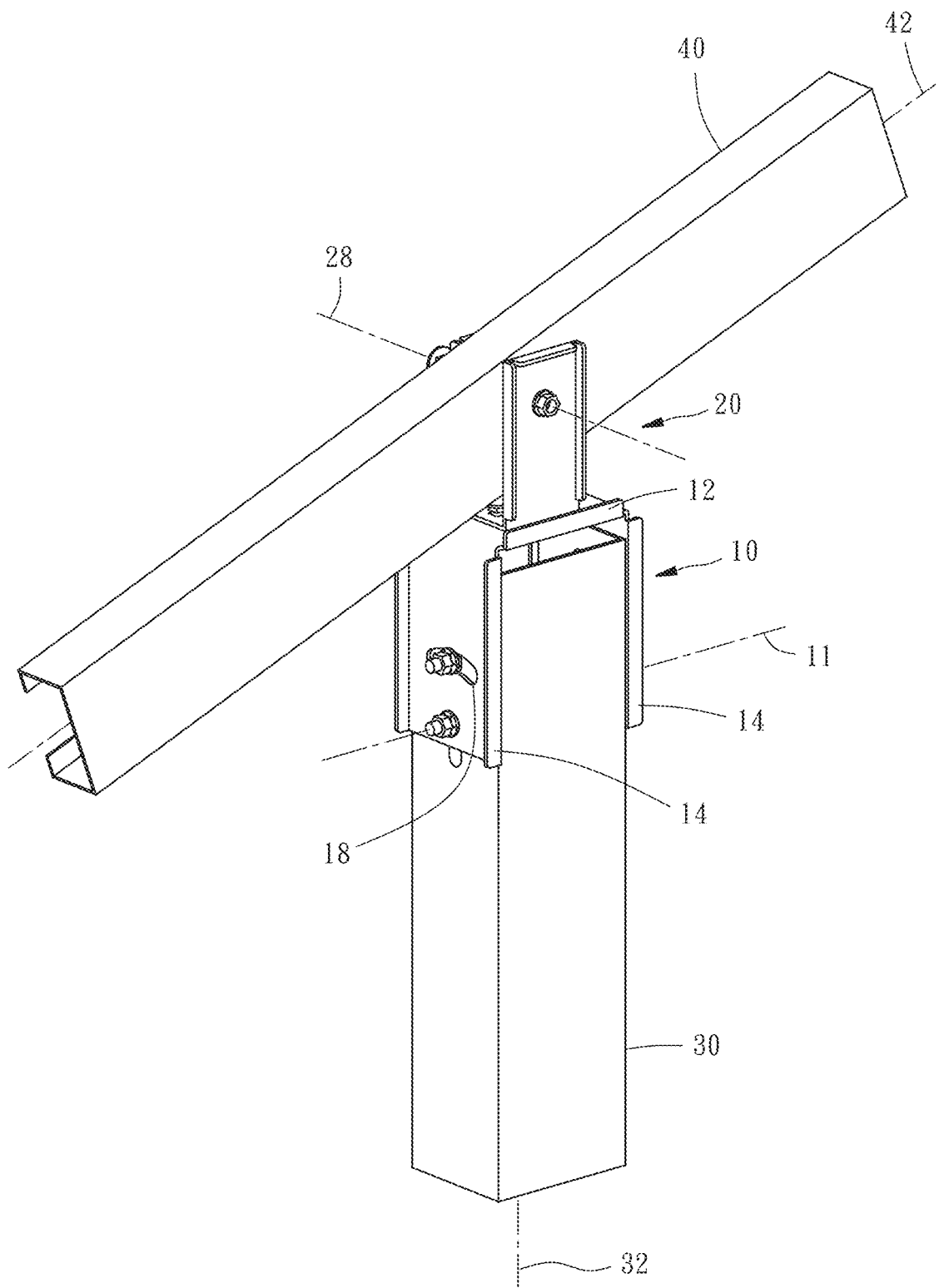
FIG. 3 is another assembled perspective view of the preferred embodiment in FIG. 1.

FIG. 1 to FIG. 3 show the structural steel member connecting assembly according to a preferred embodiment of the present invention. The structural steel member connecting assembly is configured mainly to couple together two structural steel members 30 and 40, which are identified hereinafter as the first structural steel member 30 and the second structural steel member 40 to facilitate a clear description of the technical contents of the invention. The first structural steel member 30 and the second structural steel member 40 in this preferred embodiment may have a C-shaped section or a square U-shaped section. The first structural steel member 30 has a first longitudinal direction 32, and the second structural steel member 40 has a second longitudinal direction 42. The first structural steel member 30 is provided with at least one positioning portion 34 along the first longitudinal direction 32. In this preferred embodiment, the first structural steel member 30 is vertical and has a plurality of positioning portions 34, which by way of example are configured as apertures and are provided at intervals in the top-end portions of the two opposite sidewalls of the first structural steel member 30 in a corresponding manner, with each aperture in one sidewall being coaxial with the corresponding aperture in the other sidewall.

The structural steel member connecting assembly includes a first connecting member 10 and a second connecting member 20. In this preferred embodiment, the first connecting member 10 has a top plate 12 and two first side plates 14 that are provided on two opposite sides of the top plate 12 respectively. The top plate 12 has an aperture 16 and a generally arcuate guide groove 18, and so does each first side plate 14. The apertures 16 of the two first side plates 14 correspond in position to each other, and so do the guide grooves 18 of the two first side plates 14. The centers of the apertures 16 of the two first side plates 14 define a first axis 11, and the center of the aperture 16 of the top plate 12 defines a second axis 13.

Figure 4:
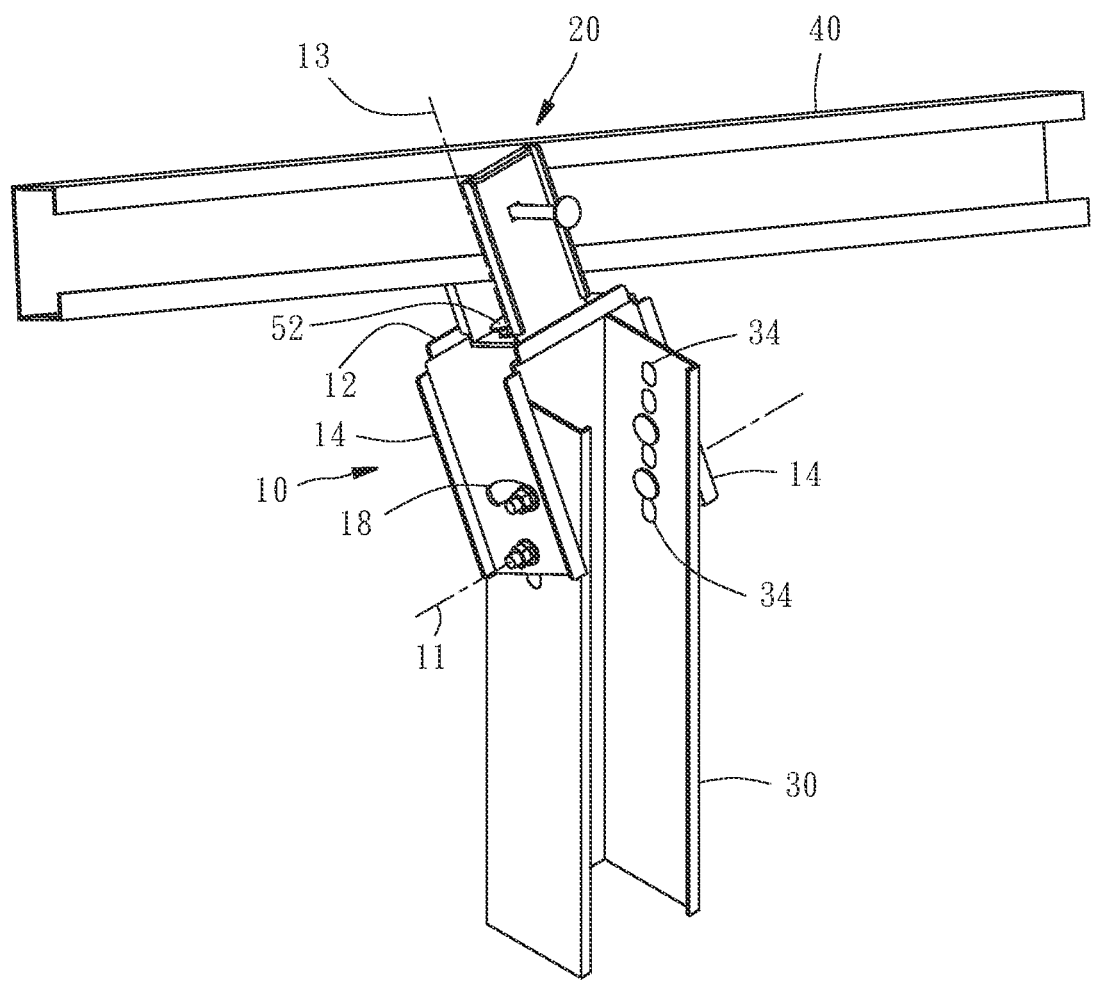
FIG. 4 is yet another assembled perspective view of the preferred embodiment in FIG. 1, showing in particular the first connecting member in a swung state.

The top end of the first structural steel member 30 is inserted in between the two first side plates 14 of the first connecting member 10. A bolt 50 is passed through the aperture 16 of each first side plate 14 of the first connecting member 10 and a corresponding one of the positioning portions 34 of the first structural steel member 30 such that the first connecting member 10 is pivotally connected to the top end of the first structural steel member 30 and can be swung with respect to the top end of the first structural steel member 30 about the first axis 11. In addition, as shown in FIG. 3 to FIG. 5, a bolt 52 is passed through the guide groove 18 of each first side plate 14 of the first connecting member 10 and a corresponding one of the positioning portions 34 such that when the first connecting member 10 is swung with respect to the first structural steel member 30, the guide grooves 18, which in this preferred embodiment are arcuate by way of example, limits the range in which and the angle by which the first connecting member 10 can be swung with respect to the first structural steel member 30.

Figure 6:
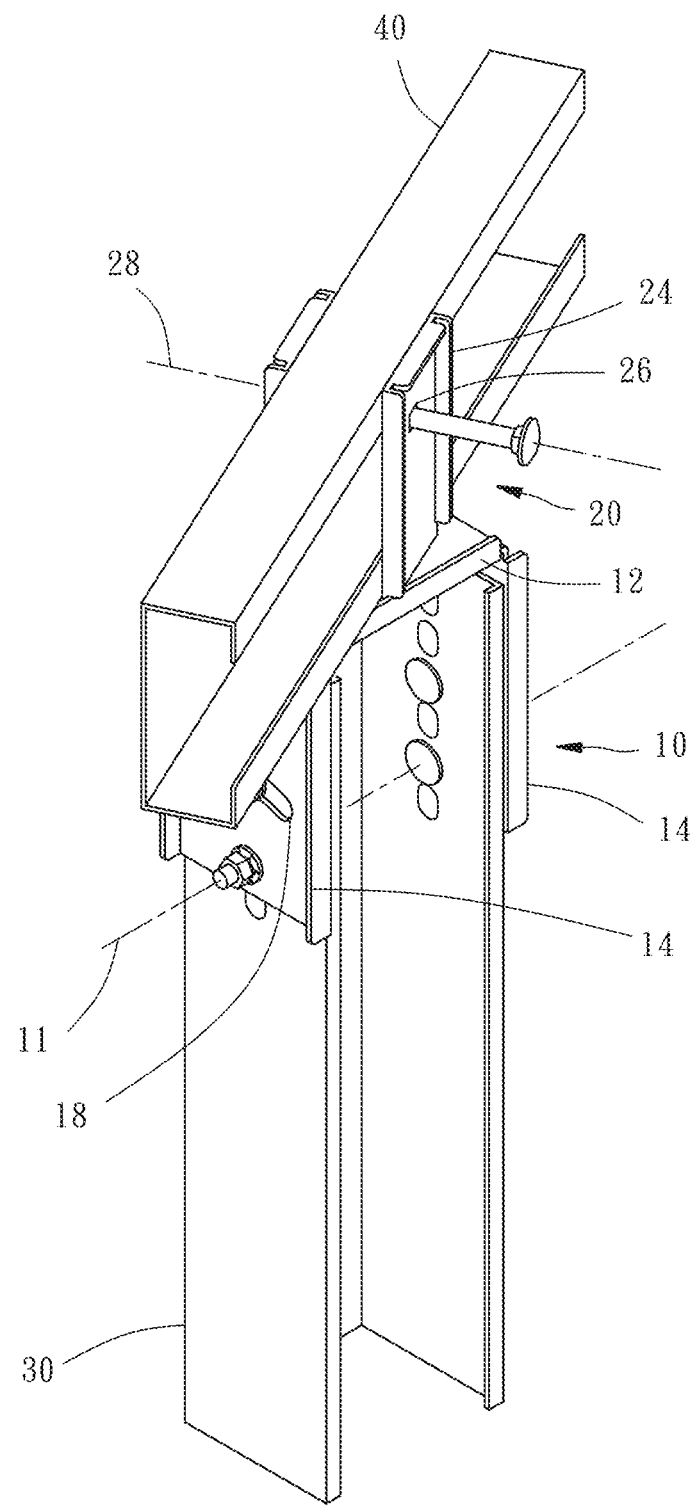
FIG. 6 is similar to FIG. 4, showing in particular the second connecting member in a rotated state with respect to the first connecting member.

The second connecting member 20 has a bottom plate 22 and two second side plates 24 that are provided on two opposite sides of the bottom plate 22 respectively. A bolt 50 is passed through the bottom plate 22 of the second connecting member 20 and the aperture 16 of the top plate 12 of the first connecting member 10 to pivotally connect the second connecting member 20 to the first connecting member 10 and allow relative rotation between the first connecting member 10 and the second connecting member 20 about the second axis 13. Moreover, a bolt 52 is passed through the bottom plate 22 of the second connecting member 20 and the arcuate guide groove 18 of the top plate 12 of the first connecting member 10 such that when the second connecting member 20 is rotated with respect to the first connecting member 10 as shown in FIG. 6 and FIG. 7, the guide groove 18 of the top plate 12 of the first connecting member 10 limits the angle between the first connecting member 10 and the second connecting member 20.

The second structural steel member 40 is put in between the two second side plates 24 of the second connecting member 20 from a lateral side of the second connecting member 20 at a predetermined angle. The second connecting member 20 has a fixing portion 26 for coupling with the second structural steel member 40. In this preferred embodiment, the fixing portion 26 is a pair of through holes provided respectively in the two second side plates 24 by way of example. A bolt 50 is passed through the fixing portion 26 of the second side plates 24 of the second connecting member 20 and the second structural steel member 40 such that the second structural steel member 40 is pivotally connected to the second connecting member 20, with the first longitudinal direction 32 of the first structural steel member 30 intersecting the second longitudinal direction 42 of the second structural steel member 40. The second structural steel member 40 can be horizontally swung with respect to the first connecting member 10 (i.e., with respect to the first structural steel member 30) about the second axis 13 via the second connecting member 20 as shown in FIG. 6 and FIG. 7, and can also be vertically swung in place with respect to the first structural steel member 30 about a central axis 28 defined by the fixing portion 26 as shown in FIG. 8.

Figure 5:
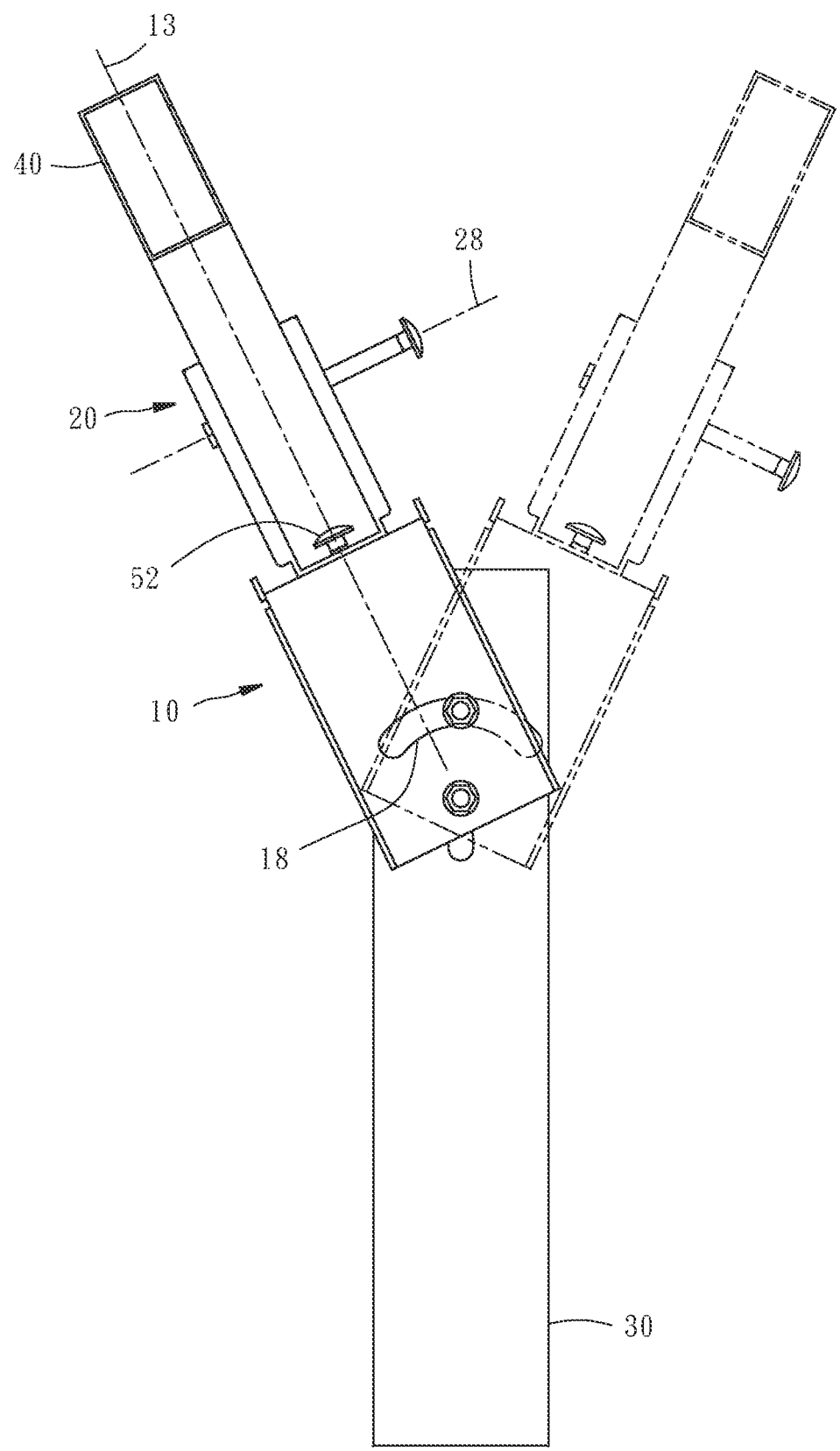
FIG. 5 is a side view of the preferred embodiment in FIG. 1, showing in particular the first connecting member in a swung state.
Figure 7:
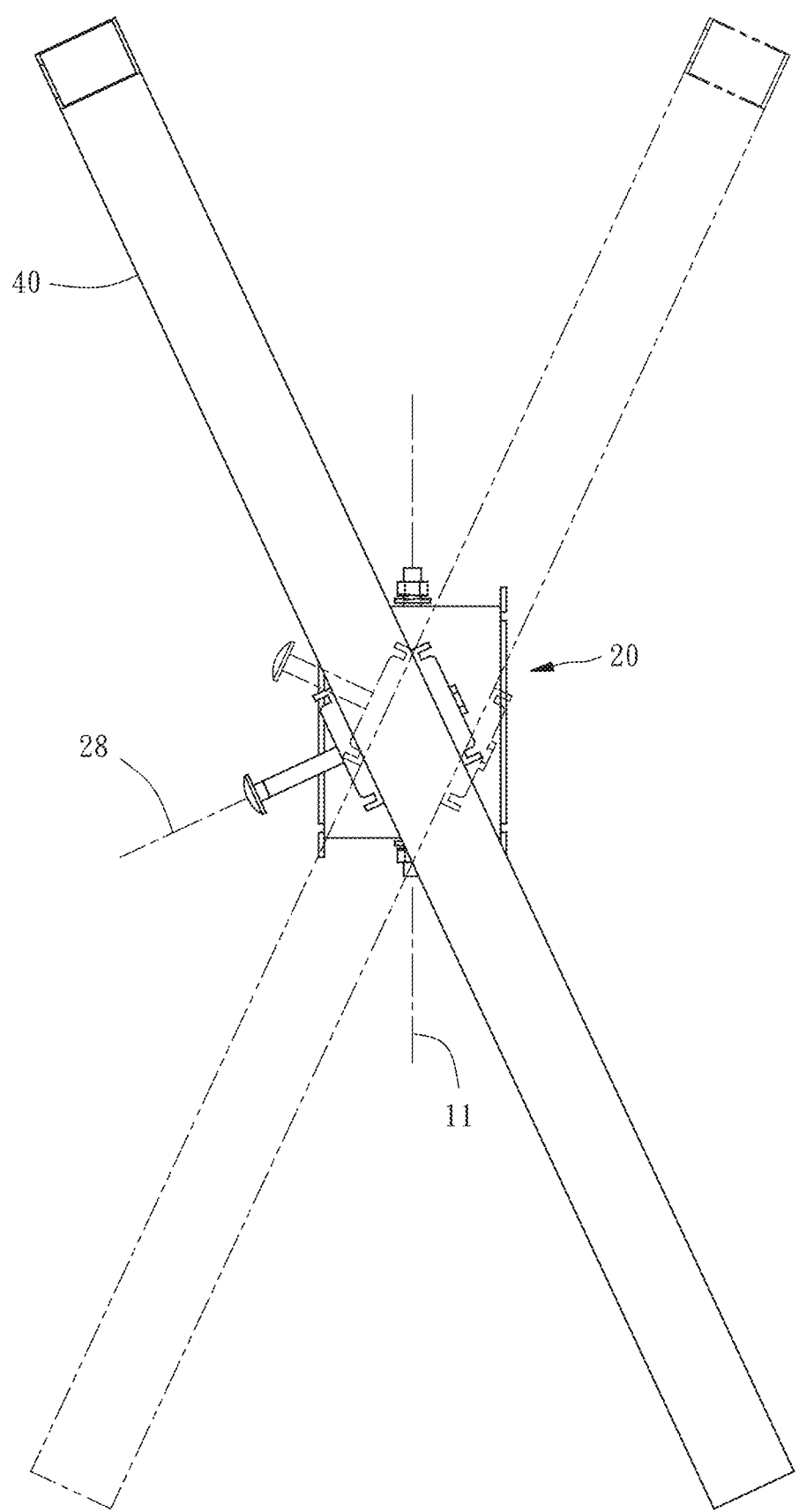
FIG. 7 is a top view of the preferred embodiment in FIG. 1, showing in particular the second structural steel member being horizontally swung in place.
Figure 8:
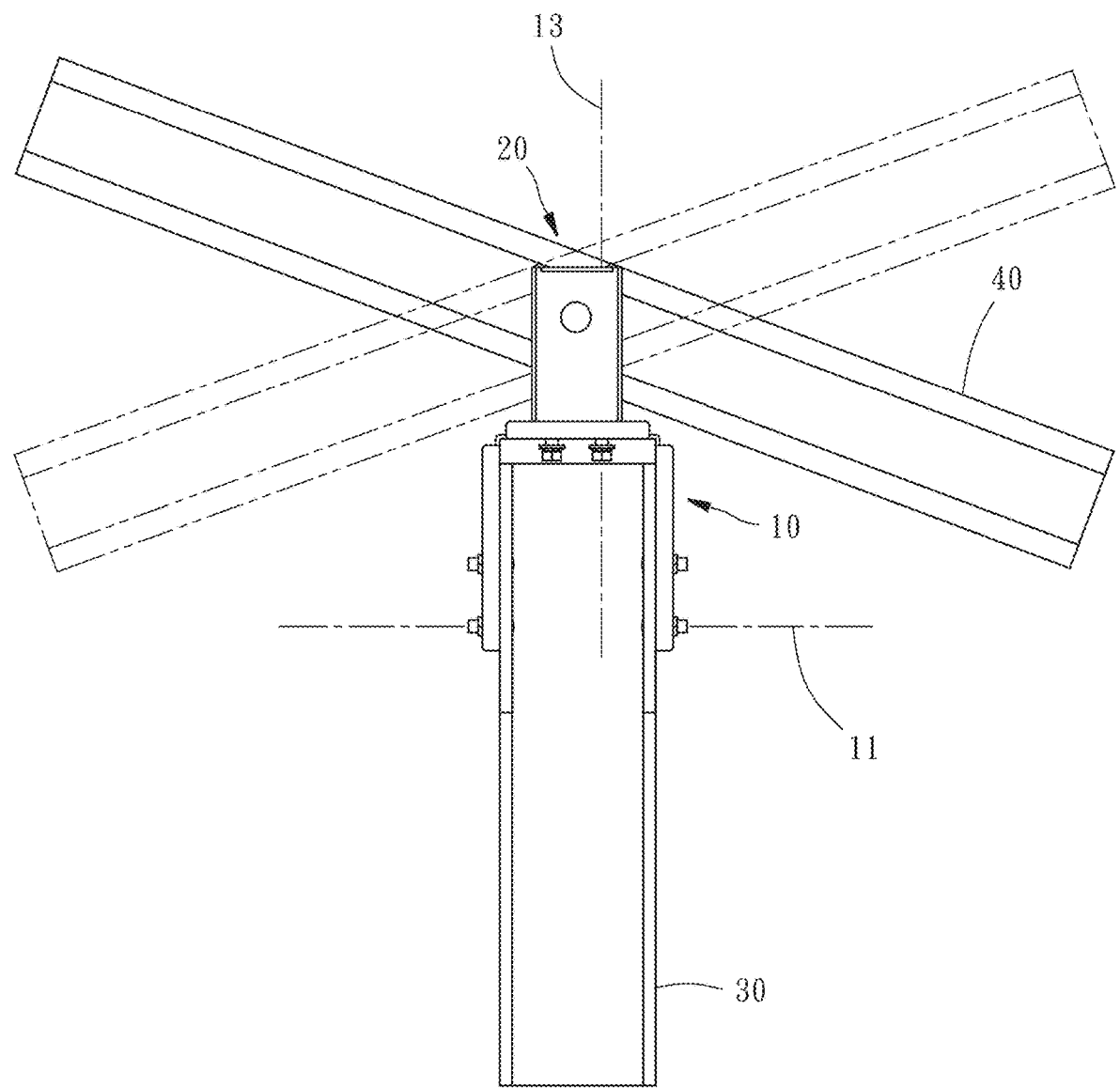
FIG. 8 is a front view of the preferred embodiment in FIG. 1, showing in particular the second structural steel member being vertically swung in place.

According to the above, and as shown in FIG. 5, FIG. 7, and FIG. 8, the structural steel member connecting assembly of the present invention allows the first structural steel member 30 and the second structural steel member 40 to be swung about the first axis 11, the second axis 13, and the central axis 28 (defined by the fixing portion 26) of the first connecting member 10 and the second connecting member 20 and thereby adjusted to different angles and directions. In FIG. 5 for example, the first connecting member 10 is swung with respect to the first structural steel member 30 about the first axis 11 such that the second structural steel member 40 is swung forward or backward with respect to the first structural steel member 30 along with the first connecting member 10. In FIG. 7, the second connecting member 20 is rotated in place with respect to the first connecting member 10 about the second axis 13 such that the second structural steel member 40 is horizontally swung in place with respect to the first structural steel member 30 in unison. In FIG. 8, the second structural steel member 40 is vertically swung in place about the central axis 28 so as to be titled in different directions. During installation of the first structural steel member 30 and the second structural steel member 40, therefore, the structural steel member connecting assembly of the invention allows the connecting directions of the two members and the structural configuration of the entire assembly to be flexibly adjusted according to the conditions of the construction site. Even if the ground of the construction site has significant height differences or is not completely horizontal, the relative angle between the first connecting member 10 and the second connecting member 20 can be changed accordingly, in order for the first structural steel member 30 and the second structural steel member 40 to form a stable structure. Thus, the primary objective of the invention—i.e., to provide a structural steel member connecting assembly that can be used to construct a stable engineering structure with ease, that features flexibility in use, and that has extensive applications—is achieved. Furthermore, the size of the guide grooves can be modified to change the range of the relative swinging angle between the first and the second structural steel members and thereby enhance the usefulness of the invention.

What is claimed is:

1. A structural steel member connecting assembly for coupling two structural steel members together, wherein each of the two structural steel members has a longitudinal direction, and one of the structural steel members is provided along the longitudinal direction thereof with at least one positioning portion, the structural steel member connecting assembly comprising:
   a first connecting member pivotally connected to the at least one positioning portion of the one of the structural steel members in such a way that the first connecting member is able to be swung with respect to an end of the one of the structural steel members about a first axis; and
   a second connecting member pivotally connected to the first connecting member in such a way that the first connecting member and the second connecting member are rotatable with respect to each other about a second axis, wherein the second connecting member has a fixing portion coupled with the other of the structural steel members such that not only do the longitudinal directions of the two structural steel members intersect, but also the other of the structural steel members is able to be swung with respect to the first connecting member about the second axis via the second connecting member,
   wherein the first connecting member has a guide groove, and a bolt is passed through the guide groove of the first connecting member and the second connecting member such that when the second connecting member is rotated with respect to the first connecting member, the guide groove limits an angle by which the second connecting member is able to be rotated with respect to the first connecting member.

2. The structural steel member connecting assembly of claim 1, wherein the first connecting member has a top plate and two first side plates provided respectively on two opposite sides of the top plate, the top plate as well as each of the two first side plates has an aperture with a center, the centers of the apertures of the two first side plates define the first axis, and the center of the aperture of the top plate defines the second axis.

3. The structural steel member connecting assembly of claim 2, wherein the one of the structural steel members has a top end inserted in between the two first side plates of the first connecting member, and the first connecting member is pivotally connected to one of the at least one positioning portion of the one of the structural steel members such that the two structural steel members are able to be swung with respect to each other about the first axis.

4. The structural steel member connecting assembly of claim 1, wherein the second connecting member has a bottom plate and two second side plates provided respectively on two opposite sides of the bottom plate, the bottom plate of the second connecting member is pivotally connected to the first connecting member in such a way that the bottom plate is rotatable about the second axis, and the other of the structural steel members is placed in between the two second side plates of the second connecting member.

5. The structural steel member connecting assembly of claim 4, wherein the other of the structural steel members is pivotally connected to the fixing portion of the second connecting member and is therefore able to be swung with respect to the one of the structural steel members about a central axis defined by the fixing portion.

6. The structural steel member connecting assembly of claim 1, wherein the bolt is passed through the guide groove of the first connecting member and one of the at least one positioning portion such that when the first connecting member is swung with respect to the one of the structural steel members, the guide groove limits an angle by which the first connecting member is able to be swung with respect to the one of the structural steel members.

* * * * *